US012291452B1

(12) United States Patent
Yaseri et al.

(10) Patent No.: US 12,291,452 B1
(45) Date of Patent: May 6, 2025

(54) PRODUCTION OF HYDROGEN FROM KEROGEN (71) Applicants: SAUDI ARABIAN OIL COMPANY, Dhahran (SA); KING FAHD UNIVERSITY OF PETROLEUM & MINERALS, Dhahran (SA)

(72) Inventors: Ahmed Zarzor Hussien Yaseri, Dhahran (SA); Pramod Dhanaji Patil, Dhahran (SA); Israa Salem Ali Abu Mahfouz, Dhahran (SA); Bidoor Alsaif, Dhahran (SA)

(73) Assignees: SAUDI ARABIAN OIL COMPANY, Dhahran (SA); KING FAHD UNIVERSITY OF PETROLEUM & MINERALS, Dhahran (SA)

(*) Notice: Subject to any disclaimer, the term of this patent is extended or adjusted under 35 U.S.C. 154(b) by 0 days.

(21) Appl. No.: 18/651,392

(22) Filed: Apr. 30, 2024

(51) Int. Cl.
*C01B 3/02* (2006.01)
(52) U.S. Cl.
CPC ........ *C01B 3/02* (2013.01); *C01B 2203/1614* (2013.01); *C01B 2203/1628* (2013.01)
(58) Field of Classification Search
CPC .... C01B 3/24; C01B 3/22; C01B 3/34; C01B 3/36
See application file for complete search history.

(56) References Cited

U.S. PATENT DOCUMENTS

| 3,617,472 A * | 11/1971 | Schlinger ................ C10G 1/06 208/414 |
| 4,521,292 A | 6/1985 | Spars et al. |
| 8,863,839 B2 | 10/2014 | Kaminsky et al. |
| 2003/0155111 A1 | 8/2003 | Vinegar et al. |
| 2003/0178191 A1 | 9/2003 | Maher et al. |

FOREIGN PATENT DOCUMENTS

DE          584538 C     9/1933

OTHER PUBLICATIONS

Schimmelmann et al. "D/H isotope ratio of kerogen . . . in hydrous pyrolysis . . . " Geochimica et Cosmochimica Acta, vol. 63, No. 22, pp. 3751-3766, (Year: 1999).*
Burnham et al. "On the mechanism of kerogen pyrolysis "Fuel, 1984, vol. 63, p. 1353-1356 (Year: 1984).*

* cited by examiner

*Primary Examiner* — Wayne A Langel
*Assistant Examiner* — Syed T Iqbal
(74) *Attorney, Agent, or Firm* — Vorys, Sater, Seymour and Pease LLP (57) ABSTRACT

A method for producing hydrogen gas is disclosed. The method includes providing kerogen; providing hydrogen; introducing the kerogen and hydrogen into a reaction chamber wherein the reaction chamber is operated at an operating temperature between about 455° C. and 510° C.; and removing a gas stream comprising hydrogen.

13 Claims, 4 Drawing Sheets

PRODUCTION OF HYDROGEN FROM KEROGEN

FIELD

The present disclosure generally relates to processes for producing hydrogen from sedimentary rocks containing kerogen, and in particular processes that use hydrogen in the production of hydrogen from kerogen.

BACKGROUND

Organic carbon is one of the most important elements in all of fuels. The thermal utilization of fuels in processes such as combustion, gasification, and pyrolysis is essentially a carbon conversion process. In different kinds of fuels, carbon elements distribute in different forms, which makes each conversion process different. This is particularly challenging in kerogen, which has varying types and different structures.

There are three types of energy-producing kerogen: types I, II, and III. The types differ based on each type's ratio of hydrogen, carbon, and oxygen. Each type has a different ratio of elements and a different structure. Each kerogen itself has a complicated hydrocarbon structure. Given the complicated structure of kerogen, the decomposition reaction of kerogen can be unpredictable. It can lead to a mix of heavy and light hydrocarbons and hydrogen. Hydrogen is a valuable energy source, so increasing the amount of hydrogen produced by the decomposition reaction is economically valuable. What is needed is a process that can produce hydrogen and minimize hydrocarbon production from the pyrolysis of kerogen.

SUMMARY

Various details of the present disclosure are hereinafter summarized to provide a basic understanding. This summary is not an exhaustive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

In one or more aspects, the present disclosure provides a method for producing hydrogen gas comprising: providing kerogen; providing hydrogen; introducing the kerogen and hydrogen into a reaction chamber wherein the reaction chamber is operated at an operating temperature between about 455° C. and 510° C.; and removing a gas stream comprising hydrogen. In one or more aspects, the reaction chamber is operated at an operating temperature between about 480° C. and 500° C.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, as will occur to one having ordinary skill in the art and having the benefit of this disclosure.

DETAILED DESCRIPTION

The present disclosure generally relates to processes for producing hydrogen from sedimentary rocks containing organic matter, and in particular processes that use hydrogen in the production of hydrogen from kerogen.

There are three types of energy-producing kerogen: types I, II, and III. The types differ based on each type's ratio of hydrogen, carbon, and oxygen. Each type has a different ratio of elements and a different structure. Each kerogen itself has a complicated hydrocarbon structure. Given the complicated structure of kerogen, the decomposition reaction of kerogen can be unpredictable. It can lead to a mix of heavy and light hydrocarbons and hydrogen. Hydrogen is a valuable energy source, so increasing the amount of hydrogen produced by the decomposition reaction is economically valuable.

Different reaction temperatures will lead to different products produced from kerogen pyrolysis. During pyrolysis at higher temperatures (e.g., 470° C.), kerogen tends to break down into lighter hydrocarbons, and at lower temperatures, tends to produce heavier hydrocarbons. At lower temperatures (e.g., less than 450° C.), C12-C12 bonds are more easily cleaved than C12-C13 bonds. Much of the lighter hydrocarbons generated in high-temperature pyrolysis may be produced indirectly from kerogen through a liquid intermediate.

It has been discovered that performing kerogen pyrolysis at certain temperatures in the presence of hydrogen drastically increases hydrogen production. The kerogen may convert to carbon black after the reaction in the presence of the hydrogen. One advantage of this process is that it produces carbon black, which is a useful material in the chemical industry. Another advantage is that this process produces significantly more hydrogen from kerogen pyrolysis as compared to other processes.

The present disclosure provides methods for producing a gas stream comprising: providing kerogen; providing hydrogen; introducing the kerogen and hydrogen into a reaction chamber; wherein the reaction chamber is operated at an operating temperature between about 455° C. and 510° C.; and removing a gas stream comprising hydrogen.

The methods of the present disclosure may include providing kerogen. Kerogen generally is an organic material that may be found in sedimentary rocks such as shale. It typically includes hydrocarbons that are insoluble in normal solvents, such as carbon tetrachloride, but which yield liquid or gaseous petroleum when heated. The methods may include providing a material for reacting wherein the material includes kerogen (hereafter "kerogenic material"). Examples of kerogenic material include sedimentary rocks, oil shales, bituminous shales, carbonaceous cherts, and marls. These kerogenic materials may be provided for reaction and hydrogen generation.

Suitable kerogens include type I, II, and III kerogens. Type I kerogens are typically derived from algal organic matter or lacustrine environments. Type II kerogens are typically derived from marine organic environments. Type III kerogens are typically derived from terrestrial plant matter.

Table A shows the elemental features of these types of kerogens.

TABLE A

| Type | Hydrogen to Carbon Atomic Ratio | Oxygen to Carbon Atomic Ratio (x100) | Total Organic Carbon (TOC) (%) |
|---|---|---|---|
| Type I | about 0.4 to about 1.8 | about 4 to about 10 | 1% to 15% |
| Type II | about 0.3 to about 1.3 | about 4 to about 15 | 2% to 10% |
| Type III | about 0.3 to about 0.9 | about 4 to about 35 | 0.5% to 5% |

The methods of this disclosure may include providing hydrogen gas and introducing the kerogen and hydrogen into a reaction chamber. The reaction chamber may be any reaction chamber of a reactor suitable for the pyrolysis reaction of the kerogen in the presence of hydrogen. As used herein, the term "reaction chamber" means the portion of the reactor where the kerogen pyrolysis reaction occurs. Suitable reactors include fluidized bed reactors, fixed bed reactors, moving bed reactors, and entrained flow reactors. The method for producing the gas stream may be batch or continuous. Continuous processes may include continually providing into the reaction chamber kerogen that has not yet been reacted by the methods of this disclosure. In some embodiments, the reaction chamber may be part of an autoclave and the method for producing the gas stream is performed in a batch fashion.

The methods may include operating the reaction chamber at an operating temperature in a range from about $t1°$ C. to about $t2°$ C., where $t1$ and $t2$ may be, independently, 455, 460, 465, 470, 475, 480, 485, 490, 495, 500, 505, or 510.

The methods may include removing a gas stream comprising hydrogen. The methods may include removing one or more gas streams. The gas streams may further include hydrocarbons and other gases.

The methods may include providing certain ratios of hydrogen and kerogen into the reaction chamber. The ratio of hydrogen and kerogen introduced in the reaction chamber may range from about $r1$ to about $r2$ moles hydrogen gas per gram of kerogen, where $r1$ and $r2$ may be, independently, 0.100, 0.150, 0.200, 0.250, 0.300, 0.350, 0.400, 0.450, 0.500, 0.550, or 0.600.

The methods may include a step that includes, before introducing the kerogen into the reaction chamber, removing moisture, oxygen, or both. Without being bound by theory, the presence of moisture, oxygen, or both may hinder the pyrolysis reaction. Thus, it may be advantageous to remove these components from the source of kerogen before the kerogen is introduced into the reaction chamber. This may be performed with a device for creating a vacuum that may be part of or separate from the reactor.

The methods may include operating the reaction chamber at a pressure from about $p1$ to about $p2$, where $p1$ psi and $p2$ psi may be, independently, atmospheric pressure, 100, 200, 300, 400, 500, 600, 700, 750, 800, 900, 1,000, 1,100, 1,200, 1,300, 1,400, 1,500, 1,600, 1,700, 1,800, 1,900, 2,000, 2,100, 2,200, 2,300, 2,400, 2,500, 3,000, 3,500, 4,000, 4,500, 5,000, or 5,500.

Non-Limiting Example Embodiments

The present disclosure is further directed to the following non-limiting embodiments:

Embodiment A: A method for producing hydrogen gas comprising: providing kerogen; providing hydrogen; introducing the kerogen and hydrogen into a reaction chamber wherein the reaction chamber is operated at an operating temperature between about 455° C. and 510° C.; and, removing a gas stream comprising hydrogen.

Embodiment B: A method for producing a gas stream comprising: providing kerogen; providing hydrogen; introducing the kerogen and hydrogen into a reaction chamber; wherein the reaction chamber is operated at an operating temperature between about 480° C. and 500° C.; and removing a gas stream comprising hydrogen.

Each of embodiments A and B may have one or more of the following additional elements in any combination:

Element 1: wherein the kerogen comprises type II kerogen.

Element 2: wherein the ratio of hydrogen and kerogen introduced in the reaction chamber ranges from about 0.100 to about 0.600 moles hydrogen per gram of kerogen.

Element 3: wherein the pressure of the reaction chamber is from about 1,500 psi to about 2,100 psi.

Element 4: wherein the temperature is about 480° C. to about 500° C.

Element 5: wherein the temperature is about 480° C. to about 490° C.

To facilitate a better understanding of the present disclosure, the following examples of preferred or representative embodiments are given. In no way should the following examples be read to limit, or to define, the scope of the invention.

EXAMPLES

Preferred examples are described in this section to aid in understanding this disclosure. This disclosure is not limited to the examples.

An experiment to determine the effect of reacting kerogen in the presence of hydrogen at an elevated temperature and pressure was performed.

The source rock comprising kerogen that was used for this experiment was a fine-grained, organic-rich carbonate mudrock (oil shale) collected from a cored well drilled in the Upper Cretaceous source rock interval. This source rock sequence is considered a potential unconventional hydrocarbon play (Abu-Mahfouz et al., 2019, 2020, 2022a, b, 2023a, b).

The source rock was evaluated before and after the experiment (i.e., pyrolysis) with RockEval. RockEval was also used on kerogen only samples. The results are shown in Table 1.

TABLE 1

| Sample | Description | Method | Quantity (mg) | S1 (mg/g) | S2 (mg/g) | Tmax (° C.) | TpkS2 (° C.) | PI | HI (mg HC/g TOC) | OI (mg HC/g TOC) | TOC (%) | Total S (%) |
|---|---|---|---|---|---|---|---|---|---|---|---|---|
| JS1 | original sample Before heating and H2 treatment | BULK ROCK | 58.2 | 3.97 | 110.9 | 413 | 453 | 0.03 | 765 | 7 | 14.5 | 2.93 |
| JS1-repeated | original sample Before heating and H2 treatment | BULK ROCK | 53.4 | 3.68 | 111.24 | 414 | 454 | 0.03 | 753 | 7 | 14.77 | 2.96 |
| JS1 | original sample Before heating and H2 treatment | KEROGEN | 54.1 | 3.65 | 108.18 | 414 | 454 | 0.03 | 596 | 6 | 18.15 | 2.44 |
| JS1-repeated | original sample Before heating and H2 treatment | KEROGEN | 53.2 | 3.71 | 108.74 | 414 | 454 | 0.03 | 595 | 6 | 18.26 | 2.42 |
| JS3 | Heated sample +H2 treatment | BULK ROCK | 55.1 | 10.28 | 28.59 | 425 | 461 | 0.26 | 617 | 8 | 4.63 | 0.65 |
| JS3-repeated 1 | Heated sample +H2 treatment | BULK ROCK | 53.1 | 8.45 | 16.81 | 433 | 471 | 0.33 | 495 | 12 | 3.39 | 0.5 |
| JS3-repeated2 | Heated sample +H2 treatment | BULK ROCK | 53.8 | 6.65 | 19.64 | 435 | 473 | 0.25 | 556 | 9 | 3.53 | 0.5 |
| JS3-repeated3 | Heated sample +H2 treatment | BULK ROCK | 53.1 | 7.63 | 20.97 | 433 | 471 | 0.27 | 560 | 10 | 3.74 | 0.49 |
| JS4 | Sample heated only (No H2) | BULK ROCK | 51.8 | 22 | 49.18 | 420 | 459 | 0.31 | 407 | 3 | 12.1 | 1.37 |
| JS4-repeated1 | Sample heated only (No H2) | BULK ROCK | 53.7 | 20.53 | 54.9 | 421 | 460 | 0.27 | 435 | 3 | 12.63 | 1.42 |

Geochemically, the RockEval analyses showed that the total organic carbon (TOC) of the studied source rock was 14.5 and 14.77 wt. %. The total sulphur (TS) was 2.93 and 2.96 wt. %. This source rock was of Type II-S kerogen and had a high generative capacity, which was indicated by its Hydrogen Index (HI) average values of 765 and 753 mg hydrocarbon/g TOC. In addition, the TOC was measured for the kerogen fraction only in the source rock and the results showed 18.15 wt. % and 18.26 wt. %.

The source rock was considered an immature-early mature source rock; Vitrinite Reflectance Equivalent (VRE) <0.6 and productivity index (PI) was 0.03. X-Ray Diffraction (XRD) results showed that calcite made the highest fraction of the carbonate mudrock source rocks.

Microscopic investigations conducted using light and SEM microscopy indicated a non-laminated mudstone lithofacies type. Calcite was the most abundant mineral detected in the sample followed by quartz and minor quantities of apatite. Organic matter was observed to fill foraminifera vacant cavities and to be disseminated in the matrix.

Figure 1A:
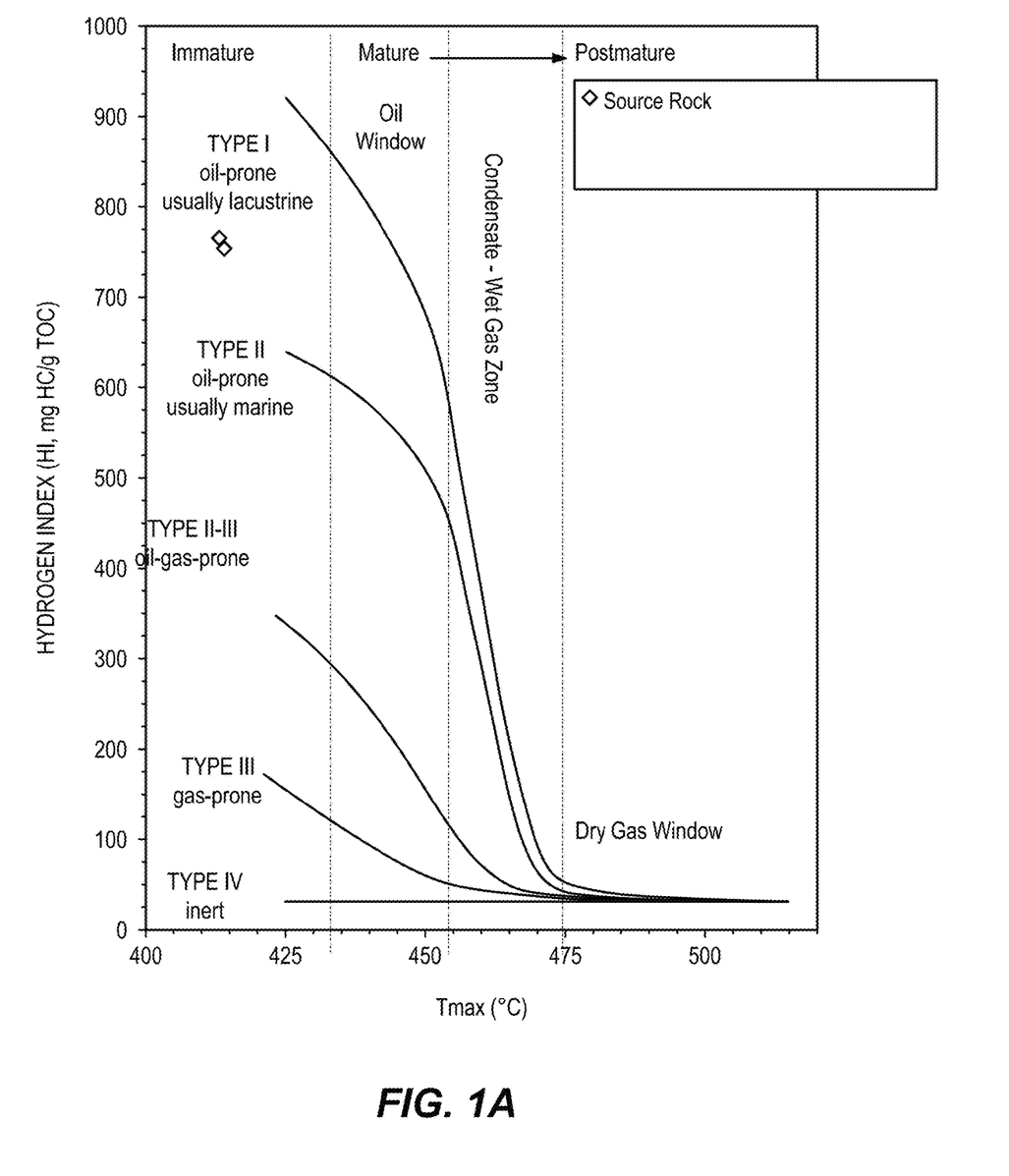
FIG. 1A shows the temperature and Hydrogen index for the source rock as observed via RockEval.
Figure 1B:
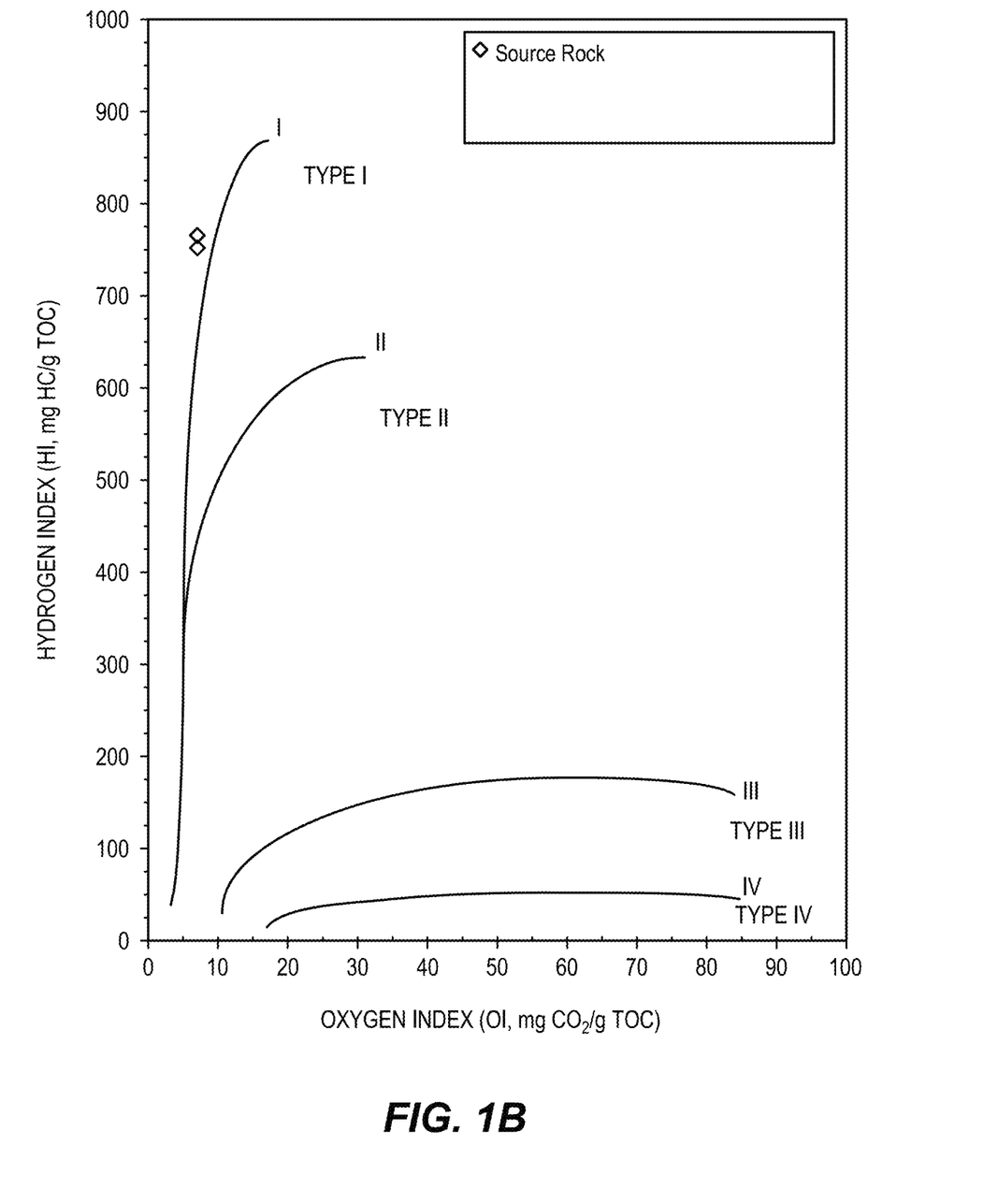
FIG. 1B shows the Hydrogen and Oxygen Indexes for the source rock as observed with RockEval.

FIG. 1A shows the temperature and hydrogen index for the source rock as studied using RockEval. FIG. 1A also compares the source rock to other kerogen types. FIG. 1A further shows that as kerogen matures, it produces different products. The products being an oil, a condensate-wet gas, and a dry gas window. The temperatures shown in FIG. 1A are from the RockEval procedure; not the control and test processes that are discussed below. FIG. 1B shows the Hydrogen Index and Oxygen Index (mg $CO_2$ per g TOC) of the source rock as compared to other kerogen types.

To evaluate the pyrolysis process used on the source rock, the source rock was first crushed to powder with an average diameter of 1 to 3 mm before being loaded into a heating autoclave in a quantity of 48 g. The autoclave was then vacuumed for two hours to remove any remaining air and moisture.

After this, the experiment was separated into two categories: control process and test process. In the control process, after vacuuming was done, the autoclave was heated to 300° C. for six hours. The pressure increased to 200 psi once 300° C. was reached. In the test process, after vacuuming was done, the autoclave was pressurized with 900 psi of hydrogen and subsequently heated to 300° C. The pressure increased to 1,800 psi once heated. In both processes the autoclave cell was linked to a gas chromatograph (GC-2014 model packed gas chromatograph, Shimazdu) to analyze the gases produced. The column used for the flame ionization detector FID results (FID) was a GasPro Column from Agilent Technologies, Inc. United States. The column used for the thermal conductivity detector (TCD) was a Shincarbon ST with 50/80 mesh sized material. The chromatograph's temperature was gradually increased from 25° C. to 250° C. The gas chromatograph lines were flushed with the produced gas until the readings were stabilized.

Figure 2:
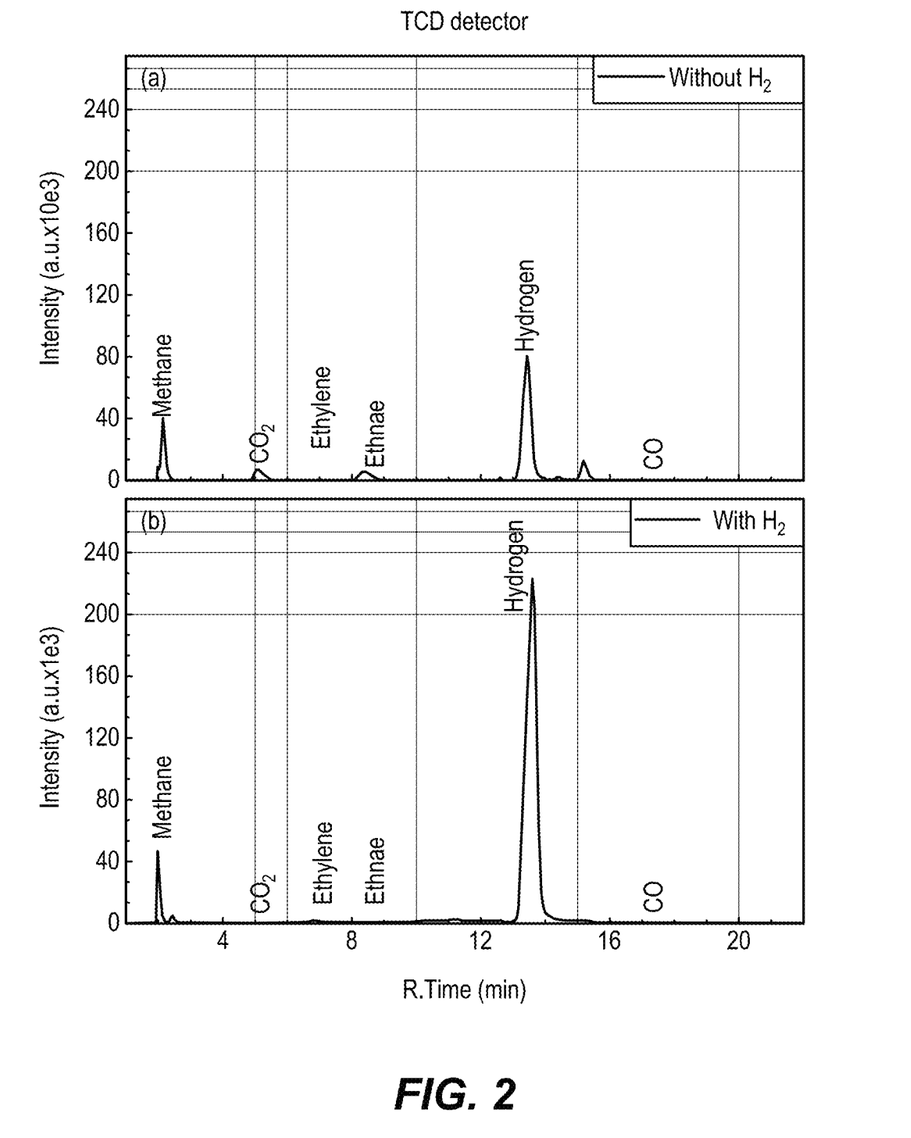
FIG. 2 shows a gas chromatogram of the gases produced from the methods of this disclosure.
Figure 3:
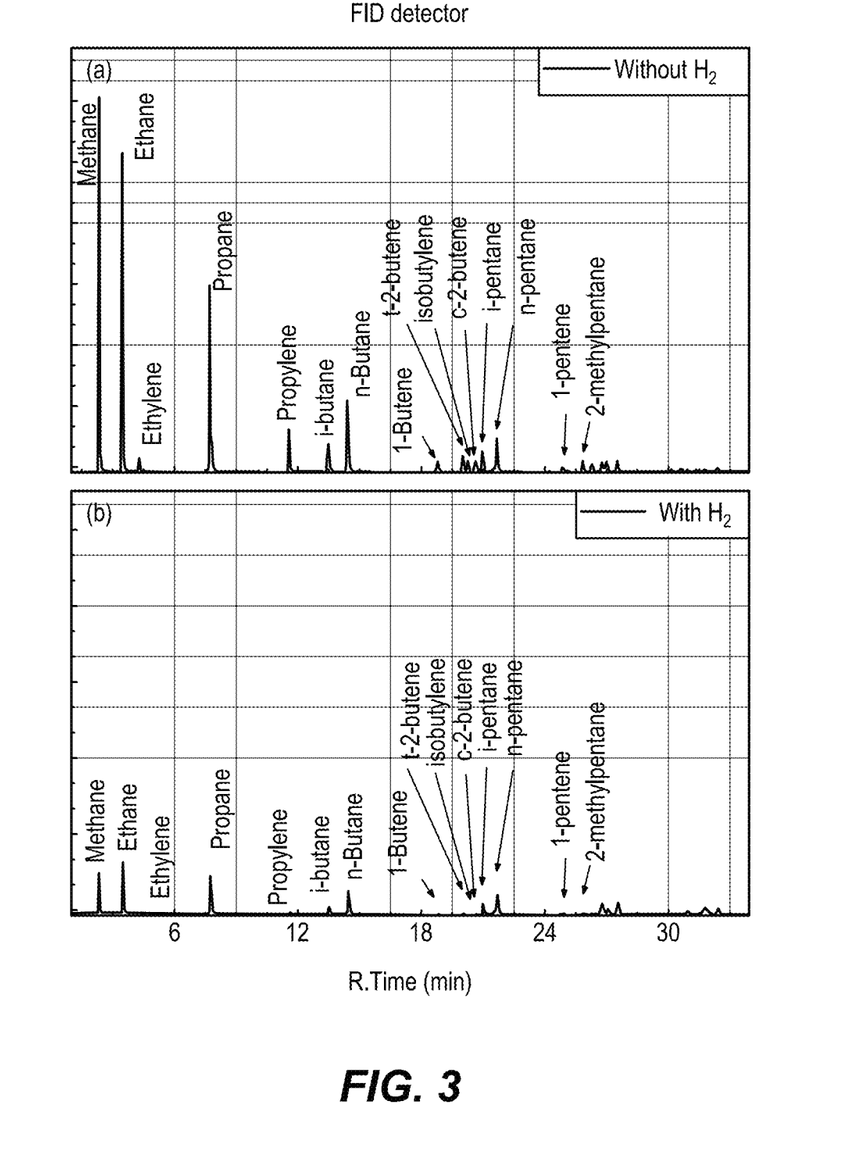
FIG. 3 shows a gas chromatogram of the gases produced from the methods of this disclosure.

FIGS. 2 and 3 show chromatograms showing the averaged results of the processes. FIG. 2 shows the TCD results, and FIG. 3 shows the FID results. The TCD results in FIG. 2 show that the yield of hydrogen significantly increased in the test process (with $H_2$) versus the control process (without $H_2$). The FID results in FIG. 3 show that the yield of methane, ethane, and propane significantly decreased in the test process versus the control process.

Table 2 shows the concentration percentage of the measured chemical species in the control and test processes.

TABLE 2

| Name | Conc.(%) Without H2 | Conc.(%) With H2 |
|---|---|---|
| Methane | 42.28672 | 25.15903 |
| Ethane | 21.44347 | 20.0059 |
| Ethylene | 0.92976 | 0 |
| Propane | 14.05135 | 15.41972 |
| Propylene | 2.84115 | 0.43542 |
| i-butane | 2.00884 | 2.74054 |
| n-Butane | 4.34847 | 7.96938 |
| 1-Butene | 0.68442 | 0.13487 |
| t-2-butene | 0.72664 | 0.24205 |
| isobutylene | 0.59737 | 0 |
| i-pentane | 2.53183 | 4.23306 |
| n-pentane | 3.51509 | 12.39426 |
| 1-pentene | 0.26446 | 0.26281 |
| 2-methylpentane | 2.84636 | 3.42379 |
| n-Hexane | 0 | 4.17421 |
| 2,4-dimethylpenta | 0 | 1.8316 |
| n-heptane | 0.92407 | 1.57337 |

Tables 3 and 4 show other measured chemical species from the control and test processes.

TABLE 3

| Name | Area.(%) Without H2 | Area.(%) With H2 |
|---|---|---|
| Methane | 0.75635 | 0.0152 |
| CO2 | 6.86985 | 0 |
| Ethylene | 0.29298 | 0.333 |
| Ethane | 7.18935 | 0 |
| Hydrogen | 76.5023 | 99.58 |
| Nitrogen | 8.24779 | 0.0423 |
| CO | 0.14137 | 0.044 |
| H2S | 0.041 | 0.024 |

TABLE 4

| | Conc. % | |
|---|---|---|
| Name | Without | With H2 |
| CO2 | 44.50472 | 0 |
| Hydrogen | 54.28598 | 99.46777 |
| CO | 1.20929 | 0.53223 |

Table 5 shows two process run results of the test process and one of the control process. The TCD rows are the thermal conductivity detector results and the FID detector rows are the flame ionization detector results.

TABLE 5

| analyzer | Carbon No. | Name | First Test Experiment - Source Rock with $H_2$ Mole (%) | Second Test Experiment - Source Rock with $H_2$ Mole (%) | Control Experiment - Source Rock without $H_2$ Mole (%) |
|---|---|---|---|---|---|
| TCD detector | 0 | Hydrogen | 94.61 | 98.89 | 50.14 |
| | 0 | Oxygen | 0.00 | 0.00 | 0.00 |
| | 0 | Nitrogen | 0.00 | 0.63 | 0.00 |
| | 1 | Carbon monoxide | 0.51 | 0.00 | 1.12 |
| | 1 | Methane | 0.00 | 0.16 | 0.00 |
| | 1 | Carbon dioxide | 0.00 | 0.92 | 0.00 |
| FID detector | 1 | Methane | 1.17 | 0.06 | 20.81 |
| | 2 | Ethane | 0.93 | 0.03 | 10.55 |
| | 2 | Ethylene | 0.00 | 0.00 | 0.46 |
| | 3 | Propane | 0.72 | 0.02 | 6.91 |
| | 3 | Propylene | 0.02 | 0.01 | 1.40 |
| | 4 | i-butane | 0.13 | 0.00 | 0.99 |
| | 4 | n-Butane | 0.37 | 0.01 | 2.14 |
| | 4 | 1-Butene | 0.01 | 0.00 | 0.34 |
| | 4 | t-2-butene | 0.01 | 0.00 | 0.36 |
| | 4 | isobutylene | 0.00 | 0.00 | 0.29 |
| | 4 | 1,3-Butadiene | 0.00 | 0.00 | 0.00 |
| | 4 | c-2-butene | 0.01 | 0.00 | 0.00 |
| | 5 | i-pentane | 0.38 | 0.01 | 1.25 |
| | 5 | n-Pentane | 0.57 | 0.00 | 1.73 |
| | 5 | 1-Pentene | 0.01 | 0.00 | 0.13 |
| | 5 | t-2-pentene | 0.19 | 0.00 | 1.40 |
| | 5 | c-2-pentene | 0.00 | 0.01 | 0.00 |
| | 6 | n-Hexane | 0.32 | 0.00 | 0.00 |
| | 6 | 1-Hexene | 0.04 | 0.00 | 0.00 |
| | $C_7H_{16}$ | n-C7 | 0.00 | 0.00 | 0.00 |
| | $C_7H_{14}$ | C7= | 0.00 | 0.00 | 0.00 |
| | 6 | Benzene | 0.00 | 0.00 | 0.00 |
| | 7 | Toluene | 0.00 | 0.00 | 0.00 |
| | $C_8H_{10}$ | Xylene | 0.00 | 0.00 | 0.00 |
| | $C_8H_{10}$ | p-xylene | 0.00 | 0.00 | 0.00 |
| | $C_8H_{10}$ | o-xylene | 0.00 | 0.00 | 0.00 |
| FID detector #2 | 7 | C7 | 0.00 | 0.01 | 0.00 |
| | 8 | C8 | 0.00 | 0.01 | 0.00 |
| | $C_3H_6O$ | acetone | 0.00 | 0.00 | 0.00 |
| | $CH_3OH$ | methanol | 0.00 | 0.00 | 0.00 |
| | $C_3H_8O$ | propan-2-ol | 0.00 | 0.00 | 0.00 |
| | $C_2H_6O$ | ethanol | 0.00 | 0.00 | 0.00 |
| | $C_6H_6$ | benzene | 0.00 | 0.00 | 0.00 |
| | $C_{10}H_{22}$ | n-decane | 0.00 | 0.00 | 0.00 |
| | $C_7H_8$ | toluene | 0.00 | 0.00 | 0.00 |
| | $C_8H_{10}$ | p-xylene | 0.00 | 0.00 | 0.00 |
| | $C_8H_{10}$ | m-xylene | 0.00 | 0.00 | 0.00 |
| | $C_8H_{10}$ | o-xylene | 0.00 | 0.00 | 0.00 |
| | $C_{12}H_{26}$ | n-dodecane | 0.00 | 0.00 | 0.00 |
| | $C_9H_{12}$ | n-propylbenzene | 0.00 | 0.00 | 0.00 |
| | $C_{13}H_{28}$ | n-tridecane | 0.00 | 0.00 | 0.00 |
| | $C_{10}H_{14}$ | n-butylbenzene | 0.00 | 0.00 | 0.00 |
| | $C_{14}H_{30}$ | n-tetradecane | 0.00 | 0.00 | 0.00 |
| | $CH_3COOH$ | acetic acid | 0.00 | 0.00 | 0.00 |
| | $C_{15}H_{32}$ | n-pentadecane | 0.00 | 0.00 | 0.00 |
| | $C_7H_8O$ | benzyl alcohol | 0.00 | 0.00 | 0.00 |
| Total detected mole | | | 100.00 | 100.00 | 100.00 |

The results show that the test process increased the hydrogen percentage in the produced gas by at least 44% and 48% as compared to the control process. Further, the test process significantly decreased methane, ethane, and propane in the produced gas. Thus, it has been shown that the test process significantly increases hydrogen production from type II kerogen.

RockEval was performed again, but this time on the reacted source rocks. The results are shown in Table 1 above in the JS3 and JS4 rows. The JS3 rows correspond to the test process source rocks; the JS4 rows correspond to the control process source rocks. The results show that the HI, TOC, and TS decreased after performing the test and control processes. The OI increased for the test process source rocks but decreased for the control process source rocks. The TOC of the test process source rocks decreased much more than the TOC of the control process source rocks.

All documents described herein are incorporated by reference herein for purposes of all jurisdictions where such practice is allowed, including any priority documents and/or testing procedures to the extent they are not inconsistent with this text. As is apparent from the foregoing general description and the specific embodiments, while forms of the disclosure have been illustrated and described, various modifications can be made without departing from the spirit and scope of the disclosure. Accordingly, it is not intended that the disclosure be limited thereby. For example, the compositions described herein may be free of any component, or composition not expressly recited or disclosed herein. Any method may lack any step not recited or disclosed herein. Likewise, the term "comprising" is considered synonymous with the term "including." Whenever a method, composition, element or group of elements is preceded with the transitional phrase "comprising," it is understood that we also contemplate the same composition or group of elements with transitional phrases "consisting essentially of," "consisting of," "selected from the group consisting of," or "is" preceding the recitation of the composition, element, or elements and vice versa.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

One or more illustrative embodiments are presented herein. Not all features of a physical implementation are described or shown in this application for the sake of clarity. It is understood that in the development of a physical embodiment of the present disclosure, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for one of ordinary skill in the art and having benefit of this disclosure.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to one having ordinary skill in the art and having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein.

What is claimed is the following:

1. A method for producing hydrogen gas comprising:
providing kerogen;
providing hydrogen;
removing both oxygen and water from a reaction chamber; then
introducing the kerogen and the hydrogen into the reaction chamber,
wherein the reaction chamber is operated at an operating temperature between about 455° C. and 510° C.; and,
removing a gas stream comprising hydrogen.

2. The method of claim 1, wherein the kerogen comprises type II kerogen.

3. The method of claim 2, wherein the pressure of the reaction chamber is from about 1,500 psi to about 2,100 psi.

4. The method of claim 3, wherein the temperature is about 480° C. to about 500° C.

5. The method of claim 3, wherein the temperature is about 480° C. to about 490° C.

6. The method of claim 1, wherein the ratio of hydrogen and kerogen introduced in the reaction chamber ranges from about 0.100 to about 0.600 moles hydrogen per gram of kerogen.

7. The method of claim 1, wherein the temperature is about 480° C. to about 500° C.

8. A method for producing a gas stream comprising:
providing kerogen;
providing hydrogen;
removing both oxygen and water from a reaction chamber; then
introducing the kerogen and the hydrogen into the reaction chamber,
wherein the reaction chamber is operated at an operating temperature between about 480° C. and 500° C.; and
removing a gas stream comprising hydrogen.

9. The method of claim 8, wherein the kerogen comprises type II kerogen.

10. The method of claim 9, wherein the pressure of the reaction chamber is from about 1,500 psi to about 2,100 psi.

11. The method of claim 10, wherein the temperature is about 480° C. to about 490° C.

12. The method of claim 8, wherein the ratio of hydrogen and kerogen introduced in the reaction chamber ranges from about 0.100 to about 0.600 moles hydrogen per gram of kerogen.

13. The method of claim 8, wherein the pressure of the reaction chamber is from about 1,500 psi to about 2,100 psi.

* * * * *